United States Patent [19]

Schonlau

[11] Patent Number: 4,914,917

[45] Date of Patent: Apr. 10, 1990

[54] BRAKE ACTUATING DEVICE FOR AUTOMOTIVE VEHICLES

[75] Inventor: Juergen Schonlau, Walluf, Fed. Rep. of Germany

[73] Assignee: Alfred Teves GmbH, Frankfurt am Main, Fed. Rep. of Germany

[21] Appl. No.: 198,033

[22] Filed: May 24, 1988

[30] Foreign Application Priority Data

May 25, 1987 [DE] Fed. Rep. of Germany ....... 3717547

[51] Int. Cl.[4] .............................................. F15B 7/00
[52] U.S. Cl. .................... 60/545; 60/547.1; 60/550; 60/562; 60/582; 91/6; 91/376 R
[58] Field of Search ............. 91/361, 459, 362, 363 R, 91/363 A, 376 R, 369 R, 6; 60/562, 547.1, 582, 545, 550

[56] References Cited

U.S. PATENT DOCUMENTS

| 1,346,898 | 7/1920 | Kingsbury ...................... 417/36 X |
|---|---|---|
| 4,395,883 | 8/1983 | Melinat .................................. 60/545 |
| 4,398,389 | 8/1983 | Horvath ................................ 60/545 |
| 4,512,615 | 4/1985 | Kita et al. . |
| 4,534,171 | 8/1985 | Leiber .................................. 60/551 |
| 4,576,417 | 3/1986 | Dobner ............................. 60/545 X |
| 4,587,883 | 5/1986 | Ehrentraut et al. ............. 91/361 X |
| 4,667,476 | 5/1987 | Takata et al. ................... 91/363 A |
| 4,749,240 | 6/1988 | Burgdorf ...................... 60/547.1 X |

FOREIGN PATENT DOCUMENTS

| 75082 | 3/1983 | European Pat. Off. . |
|---|---|---|
| 136690 | 10/1985 | European Pat. Off. . |
| 2849045 | 11/1978 | Fed. Rep. of Germany . |
| 3006610 | 2/1981 | Fed. Rep. of Germany . |
| 3224826 | 7/1982 | Fed. Rep. of Germany . |
| 3241662 | 11/1982 | Fed. Rep. of Germany . |
| 3431823 | 8/1984 | Fed. Rep. of Germany . |
| 3600729 | 7/1986 | Fed. Rep. of Germany . |
| 1374815 | 11/1974 | United Kingdom . |
| 2127505 | 4/1984 | United Kingdom . |
| 2129890 | 5/1984 | United Kingdom . |
| 2132294 | 7/1984 | United Kingdom . |
| 2169676 | 7/1986 | United Kingdom . |

Primary Examiner—Edward K. Look
Attorney, Agent, or Firm—Robert P. Seitter

[57] ABSTRACT

A brake actuating device for automotive vehicles comprises a hydraulic brake force booster and a hydraulic tandem master cylinder to which pressure is applied by the brake force booster and which is in communication with the hydraulic wheel brake circuits. The hydraulic piston of the brake force booster applies pressure to the primary master piston of the said hydraulic tandem master cylinder. Pressure is applied to the hydraulic piston of the hydraulic brake force booster from a hydraulic pressure source through a normally closed opening valve which, through a function electronic unit receiving by way of a control input in the form of a guide quantity, an input signal representative of the pedal travel is alternately opened and closed. Accordingly the hydraulic brake pressure build-up is effected in accordance with a predetermined function stored in the function electronic unit between pedal travel and brake pressure with no lost motion of the brake pedal.

23 Claims, 1 Drawing Sheet

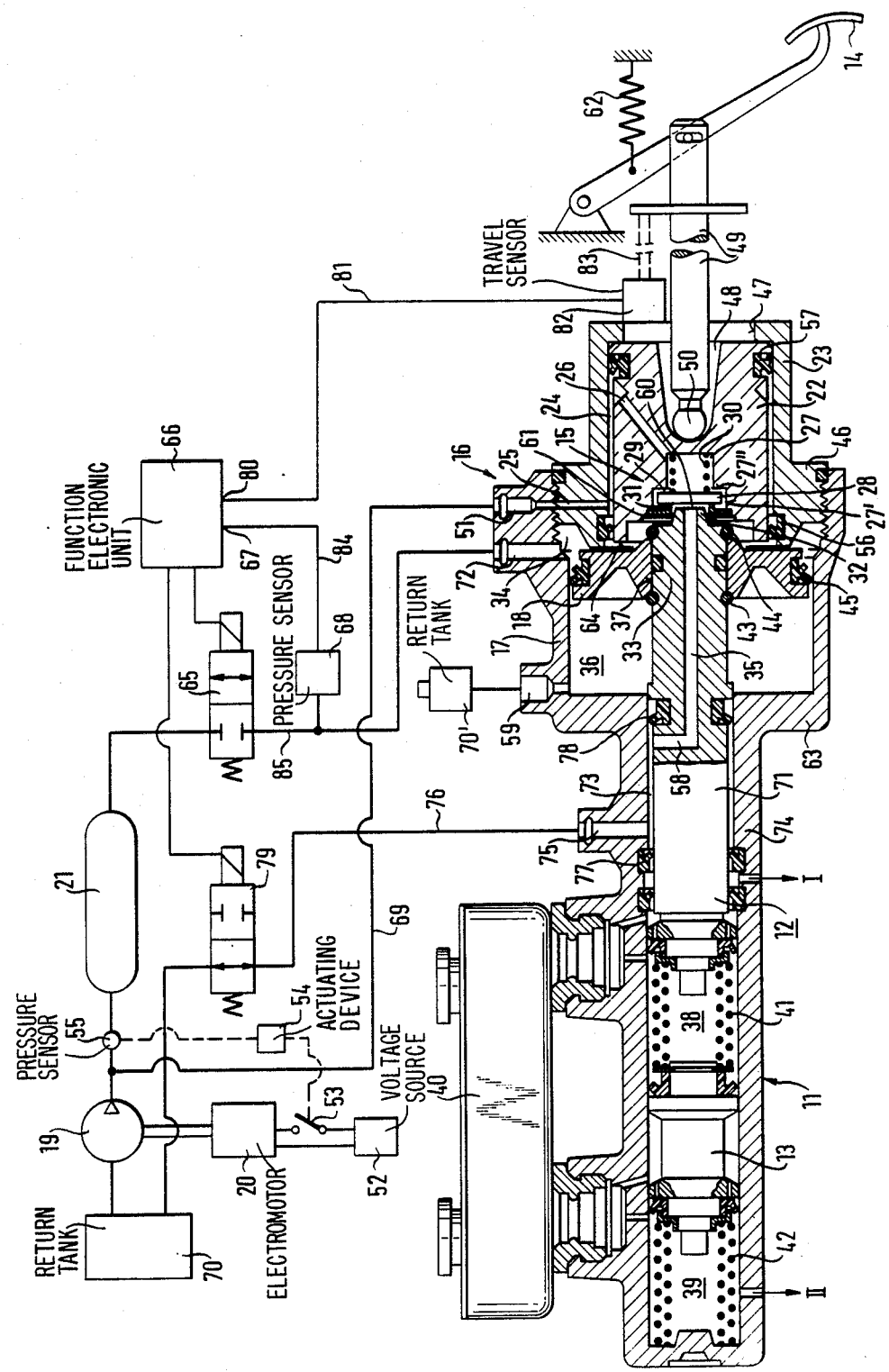

BRAKE ACTUATING DEVICE FOR AUTOMOTIVE VEHICLES

BACKGROUND OF THE INVENTION

The present invention relates to a brake actuating device for automotive vehicles, and, more particularly, to such a device for adjusting brake pedal travel and eliminating lost motion of the brake pedal.

Conventional brake actuating devices of this type, due to the light-weight construction directed to low costs, exhibit the disadvantage of large volume intakes during deceleration, which is manifested by extended pedal travel and sponge-type pedal feeling. As braking calipers with comparatively large clearance to avoid the generation of noise are being increasingly used, fast-fill master cylinders are required which further deteriorates the driver's pedal feeling. As the maximum pedal travel in heavy-duty trucks, cannot or should not be extended, the tandem master cylinder diameters have to be increased. This requires a higher boost ratio and in case of booster failure, a resulting abrupt change in ratio.

SUMMARY OF THE INVENTION

The object of the present invention is to provide a brake actuating device for automotive vehicles of the described type, wherein, despite the light-weight construction directed to low costs, the pedal travel is optimally adjusted to the driver's requirements, with special emphasis on a reduced pedal travel and a pedal feeling corresponding to the actual brake conditions during the braking process.

In the practice of the present invention, this object is achieved in that pressure is applied to the hydraulic piston of the hydraulic brake force booster by a hydraulic pressure source through a normally closed opening valve which, by means of a function electronic unit receiving, by way of a control input in the form of a guide quantity, an input control signal representative of the pedal travel and derived from a travel sensor, alternately is so opened and closed that the hydraulic brake pressure build-up is effected in accordance with a predetermined function stored in the electronic unit, between pedal travel and brake pressure with no lost motion of the brake pedal.

Through actuating the function electronic unit hence any desired function between pedal travel and brake pressure can be realized in the master cylinder, such that, the lost motion for overcoming the clearance can be substantially precluded and the reactive force caused on the brake pedal can be at the desired direct ratio to the brake effect attained.

Preferably, the pressure in the pressure chamber of the hydraulic brake force booster increases with the pedal travel after a predetermined function to a higher degree than in a linear correlation between the pedal travel and the pressure in the pressure chamber. It is provided that the function stored in the electronic unit correspond to the following functional correlation between pedal travel (s) and master cylinder pressure ($P_{Hz}$):

$$P_{Hz} = x \cdot s^y$$

wherein y is between 1 and 3 and x is a constant value, with y, preferably, being between 1.5 and 2.

According to the present invention it is, therefore, permitted and preferred that the pedal travel does not constitute a function in proportion to the piston travel of the tandem master cylinder. Hence, all volume-changing influences of the brake are separated from the pedal. In the practice of the invention, this is achieved by an electronic regulator receiving the pedal and push rod travel determined by the travel sensor in the form of a guide quantity and controlling the pressure in the booster chamber independently of the stored function.

To preclude an excessively frequent response of the pressure source preferably in the form of a hydraulic pump, a pressure-pneumatic energy supply may be provided. Advantageously, the function electronic unit comprises a regulating input through which the actual pressure prevailing in the pressure chamber of the hydraulic brake force booster is reported by a pressure sensor connected to the pressure chamber to the function electronic unit thereby enabling the pressure prevailing in the pressure chamber to be placed into the required correlation to the pedal travel.

In another embodiment, means are provided to render the brake actuating device safe against failure of the function electronic unit conveying an optimum brake feeling, that is, to insure a reliable operation of the brake system even in case of a failure of the function electronic unit. According to this preferred embodiment, the pressure in the pressure source, not only through the opening valve to which force is applied by the function electronic unit, but, in addition, through a control valve inserted between the actuating rod to which pressure is applied by the brake pedal, and the hydraulic piston, can be connected to the hydraulic chamber. The configuration of the control valve being such that the connection between the pressure source and the pressure chamber is solely established by it in the event that, in a brake pedal actuation, the opening valve remains closed due to a malfunction.

The purely mechanically operating control valve, hence, in the event of a failure of the function electronic unit, will control the hydraulic pressure in the pressure chamber of the boost cylinder. The valve components are dimensioned such that the pressure control of the control valve does not respond once the travel sensor responds to releasing a signal by the function electronic unit. It is only after this minimum travel signal on the travel sensor required for the response of the function electronic unit is exceeded, with no response on the part of the hydraulic boost piston, that the control valve which is provided for safety reasons will become operative.

Preferably, the invention is employed with brake force boosters having a tandem master cylinder. It is particularly important that a conduit leads from the pressure chamber of the boost cylinder to a return tank, which conduit, upon termination of each braking operation, permits a pressure decrease in the pressure chamber. However, in order to preclude a pressure flow-off during a braking operation through the said return conduit, according to another embodiment, a closure valve is provided in the return conduit shutting off the pressure chamber from the return tank during deceleration but otherwise connecting it to a return tank.

BRIEF DESCRIPTION OF THE DRAWING

The invention will now be described with reference to the drawing, the single of which illustrates a block diagram, partly in section, of a brake actuating device according to the present invention.

DETAILED DESCRIPTION OF A PREFERRED EMBODIMENT

As shown in the drawing, the two pressure chambers 38, 39 of a standard tandem master cylinder 11 furnished with a primary piston 12 and a secondary piston 13 are in communication with the hydraulic wheel brake circuits I and II (not shown) of an automotive vehicle. A reservoir 40 accommodates the brake fluid supplied to the pressure chambers 38, 39. The primary piston 12 and the secondary piston 13 are preloaded toward their resting position by helical compression springs 41. 42 disposed between the primary piston 12 and the secondary piston 13, or between the secondary piston 13 and the bottom of the master cylinder 11.

In the practice of the invention the tandem master cylinder 11 in the area of the primary piston 12 is integrally connected to a cylindrical member 74 of the same diameter and a hydraulic cylinder 17 of a hydraulic brake force booster 16 of a slightly larger diameter. The diameter of cylinder 17, in the practice of the invention, is approximately twice as large as the diameter of the master cylinder 11.

Disposed in axially displaceable manner within cylinder 17 is a piston 18, comprising a coaxial central opening 37 through which closely extends a circular cylindrical carrier element 33 integrally connected to an intermediate piece 71 of the same diameter as primary piston 12 of the tandem master cylinder 11 and being integrally formed therewith and disposed within the cylindrical member 74. Through axially acting snap rings 43, 44, the piston 18, axially, is tightly connected, in a locking manner, to the carrier member 33. The piston 18, by a peripheral sealant 45, is closely displaceable in axial manner within the cylinder 17.

On the side facing away from the master cylinder 11, the cylinder 17 is closed by an annular plate 46 inserted into the cylinder 17 and, radially inwardly, passing over into a control cylinder 23 of a control valve 15 the diameter of which (control cylinder 23) is between the one of the master cylinder 11 and the hydraulic cylinder 17 and which extends in a direction away from the master cylinder 11 and beyond the annular plate 46 toward the brake pedal 14.

Within the control cylinder 23 comprising a port 47 toward the brake pedal, is disposed a control piston 22 in an axially displaceable manner which, on the pedal side, comprises a central depression 48 engaged by an actuating rod 49 to which pressure is applied by brake pedal 14, which actuating rod, through a ball-and-socket-joint 50, is in actuating engagement with the control piston 22.

Provided in the annular plate 46 is a radial port 25 which, through a connection 51 and a hydraulic conduit 69, radially outwardly is connected to a hydraulic pressure source 19 which, upon actuation, takes fluid from a return tank 70 to force it through the hydraulic conduit 69 into the port 25. The pressure source 19 in the form of a hydraulic pump is actuated by an electromotor 20 which through a switch 53, can be applied to a voltage source 52. Pressure is applied to switch 53 by an actuating device 54 which is influenced by a pressure sensor 55 in communication with the pressure side of the pressure source 19 such that the pressure source 19, once it falls below a predetermined pressure, on the pressure side, is automatically turned on and, once it exceeds the operating pressure, is automatically switched off.

The radial port 25 extends through the outer wall of the control cylinder 23 into an annular chamber 24 formed between the inner wall of the control cylinder 23, the outer wall of the control piston 22 and two annular sealants 56, 57 disposed at an axial space, with the first annular sealant 56 being disposed within the annular plate 46 to closely surround the control piston 22. The second annular sealant 57 is located on the pedal-sided end of the control piston 2 within the control piston to cooperate with the interior wall of the control cylinder 23.

A port 26 extending obliquely within the control piston 22, terminates in the annular chamber 24 to extend from an area close to the pedal-sided annular sealant 57 in oblique direction toward the center following the master cylinder 11. The annular sealant 57 is located on the end facing away from the pedal 14 of the control piston 22 taking the resting position, in the immediate vicinity of the radial port 25.

The obliquely extending port 26, radially inwardly, terminates in a valve chamber 27 containing an axially acting helical compression spring 30 and, toward the master cylinder 11, is provided with a radial extension 27' and an annular step 27''. Located within the annular extension 27' is a valve disc 28 the diameter of which is slightly smaller than the diameter of the extension 27', such that a flow path for the hydraulic fluid is left about the valve disc 28.

Located on the side of the valve disc 28 facing away from the compression spring 30 is an annular valve seat 31 which is secured to the outer periphery of the annular extension 27' on the control piston 22. The annular valve seat 31 is at such a space from the annular step 27'' as to leave, during abutment of the valve disc 28 on the annular valve seat 31, between the valve disc 28 and the annular step 27'', an axial play 29 sufficient for the flow passage.

The carrier member 33 axially extending through the piston 18, opposite the valve disc 28, includes a central valve actuating projection 32 within which is provided an axial central port 35 extending in the interior of the carrier member 33 beyond the piston 1B into the intermediate member 71 to pass over into a radial port 58. The radial port 58, on the radial outer cylindrical surface of the intermediate member 71 terminates in an annular chamber 73 left between the cylindrical member 74 and the piston-type intermediate member 71. On the two axial ends thereof, the intermediate member 71 is sealed against the cylindrical member 74 through annular sealants 77 and 78, respectively, secured to the cylindrical member 74 and the intermediate member 71. A radial connection 75 branches radially from the annular chamber 73 and, through a hydraulic conduit 76 and a closure valve 79 normally in the open position, is in communication with the return tank 70.

Adjoining the side of the annular valve seat 31 facing away from the valve disc 28, is the hydraulic pressure chamber 34 of the brake force booster 16 through which hydraulic pressure can be applied to the piston 18 in the direction of the master cylinder 11.

The pressure source 19 formed as a hydraulic pump, with the pressure side thereof, in addition, is in communication with an energy accumulator 21 preferably configured as a hydro-pneuamtic pressure accumulator and connecting the pressure side of the pressure source 19 through a normally closed opening valve 65 to a radial connection 72 of the hydraulic cylinder 17 which, in the direction of the tandem master cylinder 11, is located immediately next to the radial connection 51 to establish the communication with the pressure chamber 34 of the hydraulic cylinder 17.

The closure valve 79 and the opening valve 65 are electromagnetically actuated and connected to a function electronic unit 66 comprising a control input 80 and a regulator input 67. The control input 80, through a control conduit 81 is in communication with a travel sensor B which, in the area of the actuating rod 69, is secured to the housing of the brake force booster and, owing to a control connection 83 &o the actuating rod 69, at the output thereof supplies an electric output signal representative of the pedal travel covered during the braking process.

The regulator input 67 is in communication, through a regulating conduit 84, with a pressure sensor 68 connected to the hydraulic connecting conduit 85 between the opening valve 65 and the radial connection 72 and responding to the pressure prevailing in the hydraulic connecting conduit 85.

The function electronics 66 stores a function forming a pressure signal from the pedal travel s put in as a guide quantity and controlling the master cylinder pressure according to the following function:

$$P_{Hz} = x \cdot s^y$$

wherein $P_{Hz}$ is the master cylinder pressure; x is a constant; s is the pedal travel and y is a constant having a value of between 1.5 and 2. Because of this stored function, the electronic unit 66 cyclically and continuously opens the opening valve 65, with the closure valve 79 being closed, until the pressure defined by the pedal travel as put in has been built up in the connecting conduit 85, that is, in the pressure chamber 34, resulting in the master cylinder pressure $P_{Hz}$ according to the above-defined function. The pressure sensor 68 reports to the electronic control 66 the prevailing actual pressure such that the opening valve 65 can be reclosed by the electronic unit 66 once the pressure predetermined for a special pedal travel has been built up.

Once the brake pedal 14 after a braking operation is released, the function electronics 66 correspondingly controls the decrease in pressure in the pressure chamber 34 through opening the closure valve 79 closed during deceleration, with the opening valve 65 remaining closed. In case of a failure of the function electronics 66, the travel sensor 82 or the pressure sensor 69 included, the control valve 15 inclusive of the mechanical and hydraulic components associated thereto, will become operative as follows:

After starting of the vehicle engine, the electric switch 53, through actuation means 54, will in any case be closed thereby causing the pressure source 19 to commence its operation and to charge the energy accumulator 21. After the desired operating pressure having been reached or slightly exceeded, the pressure sensor 55 will so notify the actuating means 54 then opening the switch 53 to thereby render the pressure source 19 inoperative.

Assuming failure of the function electronics 66, if a deceleration is to be effected, the brake pedal 14 will be pressed down by the driver. The control piston 22, after the opening valve 25 remaining closed, will thereby be displaced toward the piston 18, with the minor axial play 60 first existing, in the resting position, between the valve actuating projection 32 and the valve disc 28 being abandoned. Due to this axial play 16, in the resting position, the pressure chamber 34, through the ports 35, 58, the annular chamber 73, the radial connection 75, the return conduit 76 and the closure valve 79 permanently opened on account of the failure of the function electronics 66 is in communication with the return tank 70. Superposing of the valve disc 28 on the valve actuating projection 32 will discontinue the connection between the return tank 70 and the pressure chamber 34. Upon another displacement of the control piston 22 toward the pneumatic piston 18, the valve actuating projection 32 lifts off the valve disc 28 from the annular valve seat 31 to thereby form a gap therein through which a connection to the pressure source 19 is established about the valve disc 28 and the axial play 29 which, somewhat reduced, is still existing, from which pressure source hydraulic fluid can now flow into the pressure chamber 34 through the conduit 69, the port 25, the annular chamber 24 and the port 26 as well as the valve chamber 27. Under this hydraulic pressure prevailing in the pressure chamber 34, the piston 18 now moves toward the tandem master cylinder 11, carrying along the primary master piston 12 and also the secondary master piston 13 via the hydraulic pressure generated in the pressure chamber 38, resulting in the build-up of a hydraulic brake pressure in the wheel brake circuits I and II.

As shown in the drawing, a radial spring element 61 acting in the axial direction, can extend between the control piston 22 in the area of the radial expansion 27' and the valve actuating projection 32, with the spring element 61, in the resting position, holding the control piston 22 and the piston 18 in the relative position with the play 60 as shown in the drawing. As the pressure in the pressure chamber 34 acts upon the cross-sectional surface of the control piston 22, a reactive force is generated during deceleration.

As the same pressure prevails on either side of the valve disc 28 and as the helical compression spring 30 from the pedal side acts upon the valve disc 28, a flow passage is always safeguarded at 29. It is only upon termination of the braking operation and upon restoring of the brake pedal 14, for example, through the effect of a schematically shown reset spring 62, into its initial position, that the pressure prevailing in the pressure chamber 34 is applied to the control piston 22 toward the initial position thereof. During the following minor movement, the valve disc 28 places itself onto the ring valve seat 31 while the valve actuating projection 32 lifts off the valve disc 28 thereby reconnecting the pressure chamber 34 to the return tank 70, with the pistons 12, 13 being able to return to their initial position while resetting the piston 18 by springs 41, 42 and with the control piston 22 also being restored, through the spring element 61, into its initial position.

While the inside diameter of the tandem master cylinder, usually, is between 20 and 25 mm, the inside diameter of the pneumatic cylinder 17 is between about 40 and 50 mm. The front wall 63 of the cylinder 27, at the point of changeover into the cylindrical member 24, extends in a direction vertical to the axis of the master cylinder 11 and the hydraulic cylinder 17 coaxial thereto, respectively. In the event that the hydraulic vacuum source 19 should fail, the control piston 22 either through the annular step 27", the valve disc 28 and the valve actuating projection 32 or through the anterior annular edge 64 and the piston 1B could directly act upon the primary piston 12.

What is claimed is:

1. A brake actuating device for automotive vehicles comprising a hydraulic brake force booster and a hydraulic master cylinder to which pressure is applied by the brake force booster and which is in communication with the hydraulic wheel brake circuits, with a hydraulic piston of the brake force booster applying pressure to a primary master piston of said hydraulic master cylinder, wherein pressure is applied to the hydraulic piston of the hydraulic brake force booster by a hydraulic pressure source through a normally closed opening valve which, through a function electronic unit receiving, by way of a control input forming a guide quantity, an input control signal representative of brake pedal travel and derived from a travel sensor is alternately opened and closed so that the hydraulic brake pressure build-up is effected in accordance with a predetermined function stored in the function electronic unit between pedal travel and brake pressure with no lost motion of the brake pedal, and wherein the function electronic unit includes another regulation input through which the actual pressure factually prevailing in the pressure chamber of the hydraulic brake force booster is reported by a pressure sensor connected to the pressure chamber to the function electronic unit.

2. The brake actuating device according to claim 1, wherein the pressure in the pressure chamber of the hydraulic brake force booster increases with the pedal travel after a predetermined function to a higher degree than in a linear correlation between the pedal travel and the pressure in the pressure chamber.

3. The brake actuating device according to claim 1, wherein the function stored in the function electronic unit corresponds to the following functional correlation between pedal travel and master cylinder pressure:

$$P_{Hz} = x \cdot s^y$$

wherein y is between 1 and 3 and x is a constant value.

4. The brake actuating device according to claim 3, wherein y is between 1.5 and 2.

5. The brake actuating device according to claim 4, wherein when measuring the pedal travel in mm and the pressure in bar, x is between 6 and 12.

6. The brake actuating device according to claim 1, wherein the hydraulic pressure source is actuated by the automotive engine or by an electromotor.

7. The brake actuating device according to claim 6, wherein the pressure source supplies an operating pressure of between 4 and 8 bar.

8. The brake actuating device according to claim 7, wherein the maximum pedal travel corresponds to a displacement of the hydraulic piston of between 30 and 40 mm.

9. The brake actuating device according to claim 1, wherein an energy accumulator is provided between the pressure source and the brake force booster.

10. The brake actuating device according to claim 9, wherein the energy accumulator is a pressure-pneumatic accumulator.

11. The brake actuating device according to claim 1, wherein the master cylinder is a tandem master cylinder.

12. The brake actuating device for automotive vehicles comprising a hydraulic brake force booster and a hydraulic master cylinder to which pressure is applied by the brake force booster and which is in communication with the hydraulic wheel brake circuits, with a hydraulic piston of the brake force booster applying pressure to a primary master piston of said hydraulic master cylinder, wherein pressure is applied to the hydraulic piston of the hydraulic brake force booster by a hydraulic pressure source through a normally closed opening valve which, through a function electronic unit receiving, by way of a control input forming a guide quantity, an input control signal representative of brake pedal travel and derived from a travel sensor is alternately opened and closed so that the hydraulic brake pressure build-up is effected in accordance with a predetermined function stored in the function electronic unit between pedal travel and brake pressure with no lost motion of the brake pedal, and wherein the pressure of the pressure source is connected to the hydraulic pressure chamber through the opening valve to which pressure is applied by the function electronic unit and through a control valve provided between the actuating rod to which pressure is applied by the brake pedal, and wherein the hydraulic piston and the control valve are arranged to solely establish the connection between the pressure source and the pressure chamber if the opening valve remains closed due to a malfunction upon a brake pedal actuation.

13. The brake actuating device according to claim 12, wherein a control piston, on the side of the hydraulic piston of the hydraulic brake force booster facing away from the master cylinder, through the pedal brake, is disposed in axially displaceable manner in a control cylinder mounted on the hydraulic booster cylinder and, forming a component part of the control valve is displaceable to a limited extent relative to the hydraulic piston, with the control valve, in the position of maximum space corresponding to the resting position, being closed and, in the position of minimum space reached if the opening valve does not open upon applying the brakes, being opened.

14. The brake actuating device according to claim 13, wherein the control cylinder is of a smaller diameter than the hydraulic boost cylinder and of a larger diameter than the master cylinder.

15. The brake actuating device according to claim 14, wherein an annular chamber axially sealed on either side is provided between the outer periphery of the control piston and the inner periphery of the control cylinder, which annular chamber, through a port in the control cylinder, is in communication with the vacuum source and, through a port in the control piston, is in communication with a valve chamber open within the interior of the control piston toward the master cylinder.

16. The brake actuating device according to claim 15, wherein the valve chamber, toward the master cylinder, comprises a step-type extension accommodating an axially displaceable valve disc which, through a spring, relative to the control piston, toward the master cylinder is resiliently preloaded against an annular valve seat secured within the extension to the control piston, with an axial play sufficient to form a flow passage about the rim of the valve disc being present between the valve disc in abutment with the annular valve seat and the step at the beginning of the extension.

17. The brake actuating device according to claim 16, wherein a valve actuating projection on the control piston is provided on the front side of the valve disc axially facing away from the spring, and axially engaging the valve disc during the advance movement of the control piston and a carrier member connected therewith in form-locking manner, respectively, which, during applying of the brakes, lifts off the valve disc from the annular valve seat thereby connecting the pressure source to the hydraulic pressure chamber of the hydraulic brake force booster, with the lift-off of the valve disc from the annular valve seat being solely effected if the opening valve has not yet responded in view of the pedal travel covered by the time that the valve disc is in abutment with the annular projection.

18. The brake actuating device according to claim 17, wherein provided in the valve actuating projection is a central port leading to the return tank.

19. The brake actuating device according to claim 1B, wherein the central port extends to a cylindrical intermediate member connected to which is a radial bore leading to an annular chamber between the intermediate member and a cylindrical element surrounding the latter, and wherein a radial connection is provided in the cylindrical member which, through a hydraulic conduit, is in communication with the return tank.

20. The brake actuating device according to claim 19, wherein an electromagnetically operated closure valve is provided between the connection or a return conduit leading away from the pressure chamber, respectively, and the return tank, which closure valve is connected to the function electronic unit closing the same during each braking process while otherwise it is open.

21. The brake actuating device according to claim 20, wherein the annular chamber is axially sealed by annular sealants axially located inwardly on the cylindrical member or radially located outwardly on the intermediate member.

22. The brake actuating device according to claim 21, wherein the primary master piston of the master cylinder is integrally formed with the intermediate member of identical diameter, and wherein the intermediate element integrally passes over into a carrier member of identical diameter on which is axially and rigidly disposed the hydraulic boost piston and which carries the central port as well as the valve actuating projection.

23. The brake actuating device according to claim 22 wherein the other cylindrical chamber of the hydraulic boost cylinder, facing away from the pressure chamber, is in communication with a return tank.

* * * * *